(12) United States Patent
Beckenhauer

(10) Patent No.: US 9,815,015 B2
(45) Date of Patent: Nov. 14, 2017

(54) METHOD OF SYNERGISTIC DESICCATION

(71) Applicant: Dry Air Solutions, LLC, Mercer Island, WA (US)

(72) Inventor: Thomas William Beckenhauer, Puyallup, WA (US)

(73) Assignee: Dry Air Solutions, LLC, Mercer Island, WA (US)

( * ) Notice: Subject to any disclaimer, the term of this patent is extended or adjusted under 35 U.S.C. 154(b) by 0 days.

(21) Appl. No.: 14/392,034

(22) PCT Filed: Sep. 25, 2013

(86) PCT No.: PCT/US2013/000221
§ 371 (c)(1),
(2) Date: Mar. 26, 2015

(87) PCT Pub. No.: WO2014/051652
PCT Pub. Date: Apr. 3, 2014

(65) Prior Publication Data
US 2015/0209712 A1    Jul. 30, 2015

Related U.S. Application Data

(60) Provisional application No. 61/744,440, filed on Sep. 26, 2012.

(51) Int. Cl.
| | | |
|---|---|---|
| B01D 53/26 | (2006.01) | |
| B01D 53/02 | (2006.01) | |
| F26B 5/16 | (2006.01) | |
| F24F 3/14 | (2006.01) | |

(52) U.S. Cl.
CPC ........... *B01D 53/02* (2013.01); *B01D 53/261* (2013.01); *F24F 3/1411* (2013.01); *F26B 5/16* (2013.01); *B01D 2253/10* (2013.01); *B01D 2257/80* (2013.01)

(58) Field of Classification Search
CPC .. B01D 53/02; B01D 53/261; B01D 2253/10; B01D 2257/80; F24F 3/1411; F26B 5/16
USPC .............. 95/91, 117; 96/153, 154; 252/194; 34/80, 472, 473; 206/204
See application file for complete search history.

(56) References Cited

U.S. PATENT DOCUMENTS

| | | | | | |
|---|---|---|---|---|---|
| 3,382,141 A | * | 5/1968 | Burke | ...................... | D21H 5/18 162/156 |
| 4,093,435 A | * | 6/1978 | Marron | .................. | B01D 53/26 165/10 |
| 4,119,195 A | * | 10/1978 | Widener | ............ | G11B 23/0233 206/204 |
| 4,615,823 A | * | 10/1986 | Tokuyama | ............... | B01J 20/00 252/194 |
| 4,769,053 A | * | 9/1988 | Fischer, Jr. | .......... | B01D 53/261 96/125 |
| 5,009,308 A | * | 4/1991 | Cullen | ............... | B01D 53/0407 206/204 |
| 5,592,933 A | * | 1/1997 | Zucchi | ............... | A61M 16/1045 128/201.13 |
| 5,709,736 A | * | 1/1998 | Fujimura | ............... | B01D 53/06 55/400 |
| 6,135,273 A | * | 10/2000 | Cuen | ..................... | B65D 81/264 206/204 |
| 6,235,219 B1 | * | 5/2001 | Beckenhauer | ........... | B01J 20/10 204/551 |
| 6,689,197 B2 | * | 2/2004 | Dick | ...................... | B01D 53/28 156/308.4 |
| 6,720,054 B2 | * | 4/2004 | Koslow | .............. | B01J 20/28026 206/204 |
| 7,143,589 B2 | * | 12/2006 | Smith | ................... | B60H 1/3201 62/238.3 |
| 7,615,269 B2 | * | 11/2009 | Payne | .................... | B01J 20/046 428/34.1 |
| 2006/0097223 A1 | * | 5/2006 | Powers | .................. | B01D 53/28 252/194 |
| 2009/0126898 A1 | * | 5/2009 | Eplee | .................... | B01D 53/261 165/10 |
| 2014/0005307 A1 | * | 1/2014 | Cernohous | ............... | C08K 3/22 524/35 |

FOREIGN PATENT DOCUMENTS

| | | | |
|---|---|---|---|
| AU | 2002340570 B2 | | 3/2008 |
| FR | 2931083 | * | 4/2003 |
| RU | 2043587 C1 | | 9/1995 |
| RU | 2150877 C1 | | 6/2000 |
| RU | 59939 U1 | | 1/2007 |
| WO | WO 1997/033043 A1 | | 9/1997 |

OTHER PUBLICATIONS

Machine-generated English translation of WO2003035247, published May 2003.*

* cited by examiner

*Primary Examiner* — Frank Lawrence
(74) *Attorney, Agent, or Firm* — Seed IP Law Group LLP

(57) ABSTRACT

Synergy between component parts of desiccants is disclosed that teaches how to augment performance of desiccants in the reduction of humidity. Single component desiccants lack the synergistic effect. The problem of single component deficiency is solved by the disclosed methods that generally engage the synergy between humidity attracting substances and polymeric substances. Synergy is observed in the improved desiccation being greater than the sum of the desiccating effects of the component parts. Resultant products are dual purpose in that they can be used both as desiccants and component parts of packaging materials.

15 Claims, No Drawings

METHOD OF SYNERGISTIC DESICCATION

DESCRIPTION OF THE INVENTION

The present invention generally relates to a method or methods of desiccation by removal of humidity from atmospheres that contain humidity. Other desiccants have been shown to be useful; however, the effectiveness of the disclosed desiccants is a new and useful improvement thereof.

The present invention discloses novel methods that generally employ uses of humidity attracting substances and a polymeric substance.

In one embodiment, the compositions used in the method to desiccate humidity engage the class of substances that include but are not limited to: deliquescent compounds, hygroscopic compounds, humectants, absorbents, adsorbents, and dehumidifiers. The compositions used in the method to desiccate humidity include another separate class of substances that include but are not limited to: cellulose, paper, paper products, wood fiber substances, cotton fiber substances, polymers that contain hydroxyl groups, and polymers with water absorbing qualities.

The new and useful improvements of the present invention may be illustrated by the following examples. In each example a chamber containing humidity was prepared by use of an enclosed one quart container that contained about ½ inch of water on the bottom. A perforated platform was suspended about one inch above the bottom of the container for the purpose of suspending test materials. Humidity was allowed to form inside the container through the evaporation of the water in the bottom of the container and was contained by the lid placed on the container. Results were recorded as percent of sample gained as humidity by the formula: % gain as humidity=[(final weight after exposure to humidity minus dry weight) divided by dry weight] times 100%.

EXAMPLE 1

Dry samples of plain paperboard were placed in the above described chamber and amount of weight gained as humidity was measured.

During a 24 hour test period the plain paperboard samples gained 13.18% of their weight as humidity.

EXAMPLE 2

Dry samples of calcium chloride crystals were placed in the above described chamber and amount of weight gained as humidity was measured.

During a 24 hour day test period the calcium chloride crystals gained 15.82% of their weight as humidity.

EXAMPLE 3

Dry samples of paperboard were contacted with an aqueous solution of calcium chloride and then dried. The final dried combination of calcium chloride and paperboard (hereafter "treated paperboard") was 83.67% paperboard and 16.33% calcium chloride. The dry treated paperboard samples initially weighed 10.41 grams. Of the 10.41 grams, 1.70 grams was calcium chloride and 8.71 grams was paperboard. The treated paperboard samples were then placed in the above described chamber and the amount of weight gained as humidity was measured. During the 24 hour test period the treated paperboard gained 37.46% of its weight as humidity. The mass of water gained was 3.90 grams.

Interpretation of the results: The treated paperboard exhibited an unexpected and highly positive, new and useful improvement over the expectations of the sum of its two parts. When the expected desiccating effect of paperboard is added to the expected desiccating effect of calcium chloride the sum is far less than the desiccating effect of the treated paperboard. Clearly there is a synergistic effect between the paperboard and the calcium chloride that is exemplified in the treated paperboard, and clearly that synergistic effect is greater than what would logically be expected from the sum of the desiccating effects of the two parts.

When the paperboard portion of the treated paperboard in example 3 is considered, the 8.71 grams of paperboard should have increased by 13.18% as it did in example 1 for a gain from humidity of 1.15 grams (8.71 grams×0.1318=1.15 grams). When the calcium chloride portion of the treated paperboard in example 3 is considered, the 1.70 grams of calcium chloride should have increased by 15.82% as it did in example 2 for a gain from humidity of 0.27 grams (1.70 grams×0.1582=0.27 grams). Therefore, 1.15 grams of humidity+0.27 grams of humidity=1.42 grams of humidity which is what is expected if the gain from treated paperboard is merely the sum of its parts. However, the actual gain of the treated paperboard was 3.90 grams. That's over 2.74 times what is expected (3.90 grams/1.42 grams=2.746 times as effective). Therefore, the treated paperboard represents a new and useful improvement thereof over the sum of the expected desiccating effects of its two parts.

If the effect of calcium chloride found in example 2 was subtracted from the result of the treated paperboard in example 3 then 3.90 grams (grams of humidity absorbed by the treated paperboard)−0.27 grams (grams of humidity absorbed by the amount of calcium chloride in the treated paperboard)=3.63 grams of humidity. If it were to be considered that all of the synergistic effect came from an enhanced paperboard then it could be said that the paperboard was augmented by more than triple (3.63/1.15=3.16 times as effective).

If the effect of plain paperboard found in example 1 was subtracted from the result of the treated paperboard in example 3 then 3.90 grams (grams of humidity absorbed by the treated paperboard)−1.15 grams (grams of humidity absorbed by the amount of paperboard in the treated paperboard)=2.75 grams of humidity. If it were to be considered that all of the synergistic effect came from an enhanced calcium chloride then it could be said that the calcium chloride was augmented by over 10 times (2.75/.027=10.19 times as effective).

Conclusion of the above test examples: The overall synergistic effect of the treated paperboard was more than 2.74 times as effective a desiccant as was the sum of the separate desiccating effects of paperboard and calcium chloride.

When the individual desiccating effect of calcium chloride is subtracted from the humidity absorbed by the treated paperboard, then the paperboard portion of the treated paperboard is more than 3 times as effective in its synergistic effect.

When the individual desiccating effect of paperboard is subtracted from the humidity absorbed by the treated paperboard, then the calcium chloride portion of the treated paperboard is more than 10 times as effective in its synergistic effect.

Manner and Process of Making and Using the Invention

The present invention can generally be made by combining polymeric substances with humidity attracting substances.

More specifically the polymeric substances may include but are not limited to the list of: cellulose, paper, paper products, wood fiber, wood fiber products, paperboard, corrugated paper products, cellulose acetate, natural or synthetic sponges, cotton, synthetic fibers, polyvinyl acetate, polyurethane, poly(acrylate), polystyrene, polyurethanes, poly(alkylmethacrylates) such as poly(methylmethacrylate), poly(ethylmethacrylate), poly(propylmethacrylate), poly(butylmethacrylate), epoxies, natural and synthetic rubber, polyvinylidene chloride, polyesters, natural resins such as rosin, shellac, linseed oil, capal, dammar, amber, and mastic, aloe, labdanum, alkyd resins, esters of polycarboxylic acids and polyhydroxyl alcohols, styrene butadiene resins and latexes, vinyl resins, poly(vinyl toluene), phenolics, urethanes, polyethylene, polyamides (i.e., nylons), silicones, tetrafluoroethylene (i.e., TEFLON), acrylonitrile, collodion (i.e., guncotton dissolved in alcohol or ether), natural and synthetic waxes, oils, gelatin, pectin, acetate fiber, vinyl acetate, vinyl chloride, and the like, and polyvinyl alcohol where polyvinyl alcohol is considered to be a polymeric substance and represents up to 44% of the weight of the combination of polymeric substance and humidity attracting substance.

More specifically the humidity attracting substances may include but are not limited to the list of: deliquescent compounds, deliquescent salts, hygroscopic compounds, hydrophilic compounds, hygroscopic salts, humectants, absorbents, adsorbents, dehumidifiers, phosphorous oxide, sodium silicate, potassium silicate, potassium acetate, bentonite, montmorillonite clay, silica gel, molecular sieve, monohydric compounds, polyhydric compounds, calcium chloride, cobalt chloride, and polysaccharides such as starch and cellulose.

The following is an example of the manner and process of making and using the present invention.

A 20% aqueous solution of calcium chloride is prepared by dissolving 20 grams of calcium chloride in 80 grams of water. 8.5 grams of the 20% calcium chloride solution are then applied to the surface of 8.7 grams of dry paperboard and the resultant treated paperboard is then dried. The resultant treated paperboard is then 8.7 grams of paperboard and 1.7 grams of calcium chloride, or 83.67% paperboard and 16.33% calcium chloride. The treated paperboard is then put into service as a desiccant within an atmosphere containing humidity.

Implementation

Humidity attracting substances and polymeric substances once combined and dried become effective desiccants superior to the desiccating effects of the sum of the effects of the original humidity attracting substances or the polymeric substances. The new desiccants of the present invention have a synergy that represents a new and useful improvement thereof.

The present invention may be implemented as a part of packaging or placed specifically in an atmosphere where reduction of humidity is desired. The present invention is often printable and may become a structural part of packaging, an addition to packaging, or both.

The invention claimed is:

1. A product comprising an enclosed moisture-containing package for which desiccation is desired, wherein a desiccant material is present within the enclosed moisture-containing package, wherein the desiccant material consists essentially of a paper product treated with a hygroscopic salt, and wherein the paper product is paper, paperboard, or corrugated paper.

2. The product of claim 1, wherein the hygroscopic salt is a deliquescent salt.

3. The product of claim 1, wherein the hygroscopic salt is calcium chloride.

4. The product of claim 1, wherein the hygroscopic salt is potassium acetate.

5. The product of claim 1, wherein the paper product is paperboard.

6. The product of claim 1, wherein the paper product is paperboard and the hygroscopic salt is calcium chloride.

7. The product of claim 1, wherein the hygroscopic salt is applied to the surface of the paper product.

8. A method of desiccation, comprising placing a desiccant material in an enclosed moisture-containing package, wherein the desiccant material consists essentially of a paper product treated with a hygroscopic salt, and wherein the paper product is paper, paperboard, or corrugated paper.

9. A method for preparation of desiccant packaging, comprising forming a desiccant material into packaging for an enclosed moisture-sensitive product, wherein the desiccant material consists essentially of a paper product treated with a hygroscopic salt, and wherein the paper product is paper, paperboard, or corrugated paper.

10. The method of any one of claim 8 or 9, wherein the hygroscopic salt is a deliquescent salt.

11. The method of any one of claim 8 or 9, wherein the hygroscopic salt is calcium chloride.

12. The method of any one of claim 8 or 9, wherein the hygroscopic salt is potassium acetate.

13. The method of any one of claim 8 or 9, wherein the paper product is paperboard.

14. The method of any one of claim 8 or 9, wherein the paper product is paperboard and the hygroscopic salt is calcium chloride.

15. The method of any one of claim 8 or 9, wherein the hygroscopic salt is applied to the surface of the paper product.

* * * * *